Karl Hertel
INVENTOR.

BY

Karl J. Ross
Attorney

# United States Patent Office 3,433,501
Patented Mar. 18, 1969

3,433,501
VEHICULAR STEERING DEVICE
Karl Hertel, Ingolstadt (Danube), Germany, assignor to Auto Union G.m.b.H., Ingolstadt (Danube), Germany, a corporation of Germany
Filed Sept. 15, 1966, Ser. No. 579,764
Claims priority, application Germany, Sept. 18, 1965, A 50,292
U.S. Cl. 280—96
Int. Cl. B62d 3/10
8 Claims

ABSTRACT OF THE DISCLOSURE

To control the dirigible wheels of a vehicle from a steering column while insulating the column against impacts due to road irregularities, the wheel-orienting tie rods are coupled to the column via a rack in mesh with a pinion mounted on the column, the pinion having a barrel-shaped profile and helicoidal teeth which allow the rack to rotate about its own axis in response to severe thrusts from the tie rods; such rotation is limited by a spring-biased pressure member bearing upon a flat face of the rack, the stroke of the pressure member being limited by a surrounding housing so that the rack is jammed in an off-normal rotary position and can no longer transmit any torque to the pinion.

---

My invention relates to a vehicular steering gear of the type wherein a pinion on a steering column meshes with a rack articulated to the axles of a pair of dirigible wheels. Such a device gives a driver a "feel of the road" and lets him sense the adherence of the wheels to the surface. On rough roads, however, the wheels may receive hard impacts which are conveyed through the tie rods, the rack-and-pinion assembly, the steering column and the steering wheel to the driver's hands and which may interfere with his handling of the vehicle.

It is an object of my invention to provide an improved steering gear of the type described which resists the transmission of hard, annoying road shocks to the steering without, however, depriving the driver of his feel of the road on uneven surfaces.

In a steering gear according to the invention an obliquely toothed rack is engageable with a helicoidally toothed pinion whose diameter progressively decreases from the middle towards the axial ends of the pinion. The inclination of the oblique rack teeth and, therefore, the pitch angle of the helicoidal teeth of the pinion are so chosen that the interaction of these teeth, whether due to a rotation of the pinion together with the steering column or to an axial motion of the rack along with the associated tie rods, gives rise to a force component tending to rotate the rack about its axis. Such rotation is resisted by a biasing force, advantageously provided by a spring-loaded slider which bears upon a flat surface portion of the otherwise substantially cylindrical rack, so that the rack will be retained in a normal rotary position, in which the median axial plane of its array of teeth is perpendicular to the pinion axis, unless a sharp blow overcomes the biasing force and angularly deflects it in one direction or the other. The deflection, made possible by the barrel shape of at least the central portion of the driving pinion, dissipates part of the shock and causes a temporary wedging of the rack between its housing and the pinion whereby the steering column is momentarily jammed so that the impact is not transmitted to the steering wheel. When the shock ceases, the restoring force acting upon the rack returns it to its normal rotary position provided, of course, that the angle of inclination of the rack teeth with reference to the rack axis (which substantially corresponds to the pitch angle of the pinion teeth) is sufficiently larger than the angle of friction between the coacting tooth surfaces to prevent a permanent bind. Since the complement of that angle must also be greater than the angle of friction, in order to bring about the aforedescribed rotary rack motion in response to impact, a pitch angle of about 45° will usually be preferred.

To allow the application of a strong spring pressure to the flat rack face, the above-mentioned slider advantageously consists of a low-friction material (e.g. Teflon) so as not unduly to impede the sliding motion of the rack.

A preferred embodiment of the invention is illustrated in the accompanying drawing in which.

Figure 1:
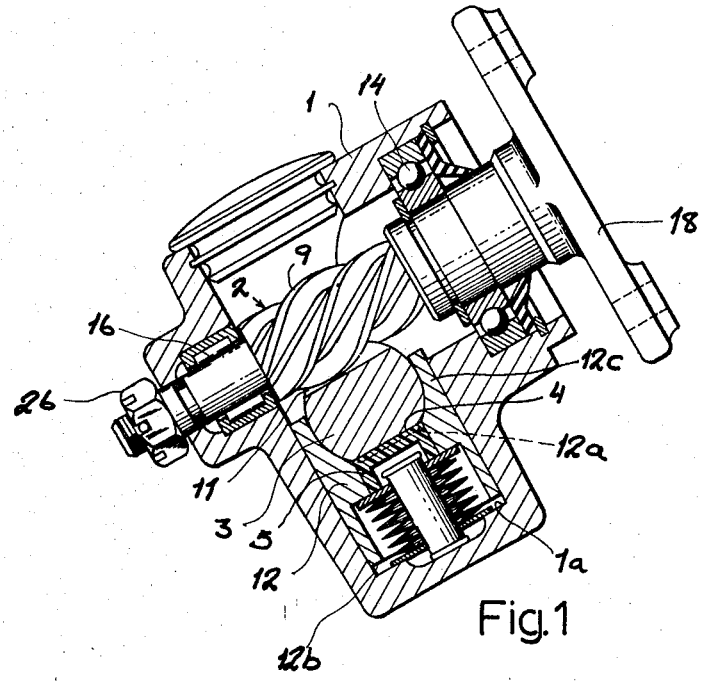
FIG. 1 is a cross-sectional view of a steering device according to the invention in a normal position.

The steering device shown in the drawing has a housing 1; journaled in it by means of a roller bearing 16 and a ball bearing 14 is a pinion 2 with helicoidal teeth 9. The pinion is fastened by a nut 26 to a collar 18 coupled via a column 17 with a steering wheel 15. In mesh with pinion 2 is a rack 3 which is connected by ball joints 22 with tie rods 19, 20 that transmit any steering movement of wheel 15 to the axles 25 of a pair of front wheels 27 dirigibly mounted on the chassis of an automotive vehicle 24.

The rack 3 has a generally circular cross-section with a flat face at 4. Against this face a slider or thrust member 5 of inverted cup shape is pressed by a stack of strong springs 6 of the dished or Belleville type. The slider 5 is made of a synthetic material with a low coefficient of friction, preferably Teflon. In the normal position of rack 3, as shown in FIG. 1, the springs 6 are only moderately loaded. In the angularly deflected rack position of FIG. 2, the springs are more highly compressed. The slider 5 moves freely in a bore 28 of a sleeve 12 which is itself slidable in housing 1.

The teeth 11 of rack 3 are slanted at 45° with reference to its axis. The tooth crests are flattened at 7 along a narrow zone on both sides of the center plane 8 of the rack. The crests of the teeth 9 on pinion 2 have a radius which progressively decreases from the transverse midsection toward the ends so that the pinion has a generally barrel-shaped body with a bulging contour 10. Sleeve 12 has a bottom recess 13 forming an annular shoulder 13a which is engaged, together with the underside of slider 5, by the upper end of the stack of springs 6 bearing with its lower end upon the inner housing wall.

The sleeve 12 is formed with a transverse cutout in which the rack 3 is rotatably cradled and which is bounded by circular-cylinder segments 12d along the inner faces of prongs 12c, these segments merging into a pair of flat shoulders 12a flanking the bore 28 below the level which the face 4 of rack 3 occupies in its normal position. When the rack 3 rotates about its axis, the corresponding edge 4a of its face 4 rides down this cutout and, after slightly deforming the slider 5 and depressing its contact surface with reference to sleeve 12, comes to rest against the shoulders 12a so that the slider and the sleeve descend together while the rack 3 becomes wedged between these shoulders and the body of pinion 2. The lower end 12b of sleeve 12 is spaced with small clearance from the bottom 1a of housing 1 to limit the extent of rotation of rack 3 which otherwise would be limited only, if at all, by the compressibility of the stack of springs 6. The maximum angle of rotation ± α substantially corresponds to the greatest angle of inclination of a tangent to the convex pinion profile 10 with reference to the pinion axis.

Figure 2:
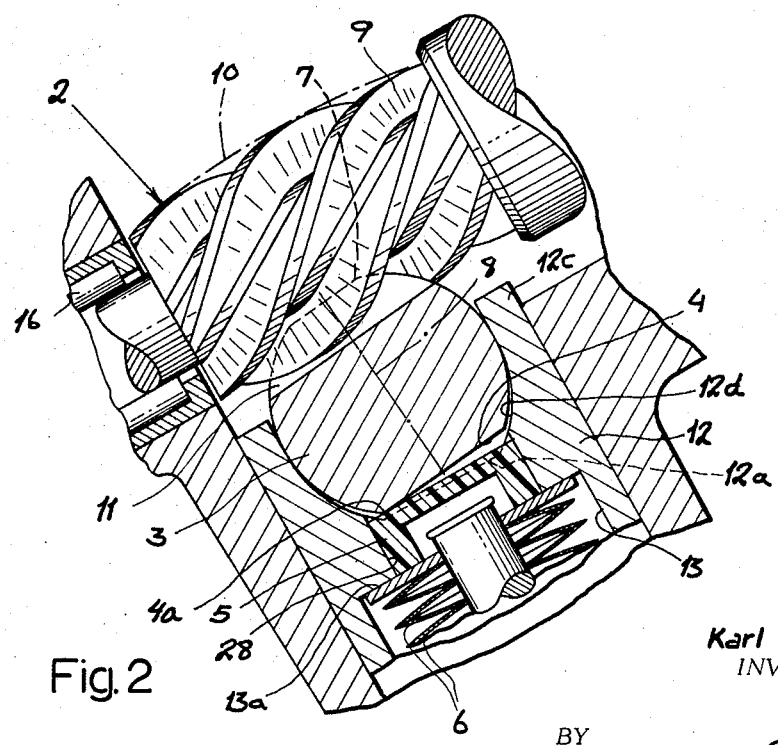
FIG. 2 is a view similar to FIG. 1, drawn to a larger scale and showing the assembly in an off-normal position which it assumes after a hard impact sustained by an associated vehicle wheel.
Figure 3:
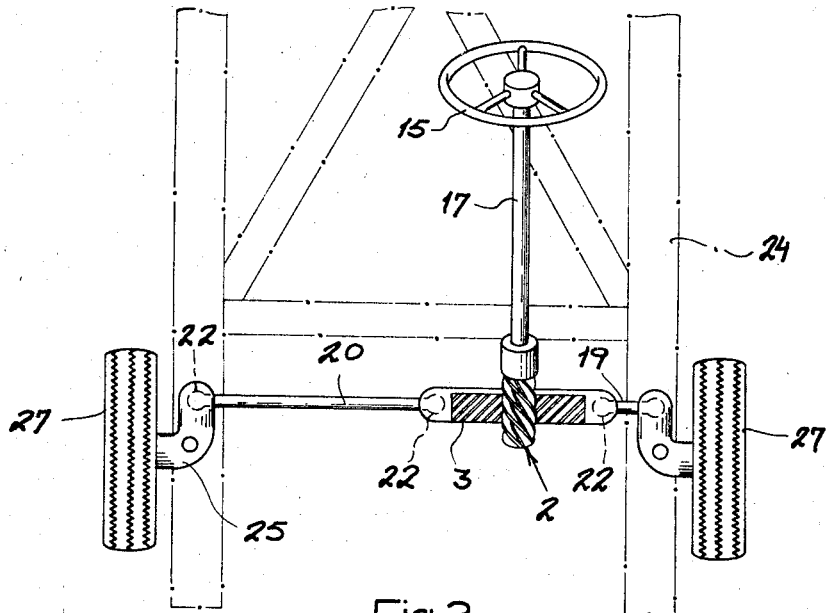
FIG. 3 is a somewhat diagrammatic top view of the front part of a vehicle body (in phantom lines) equipped with a steering device as shown in FIGS. 1 and 2.
Figure 4:
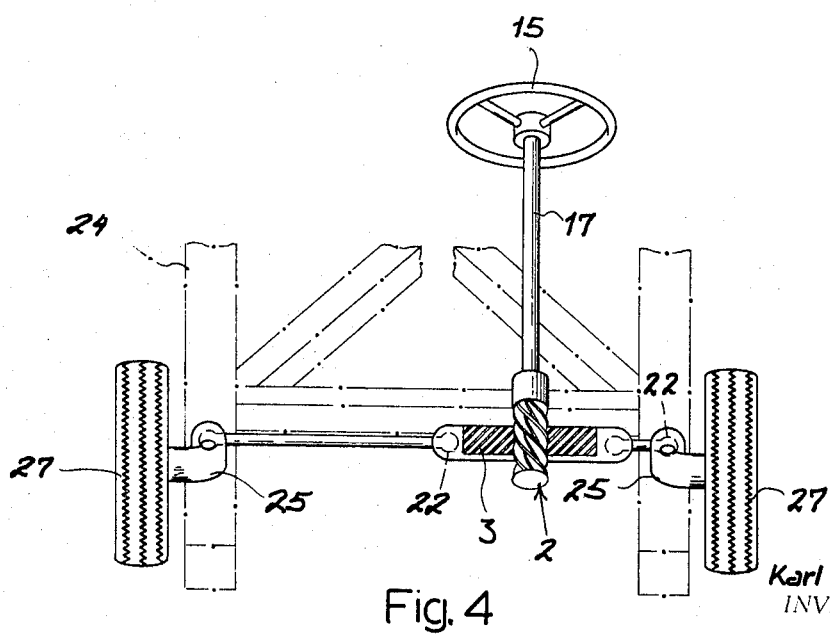
FIG. 4 is a perspective downwardly slanted front view of the vehicle body and the steering gear of FIG. 3.

Since the slider 5 is of low-friction material, rack 3 can normally move freely in longitudinal direction in spite of the strong lateral pressure exerted on it by the springs 6. This pressure suffices to prevent any rotation of the rack about its axis due to the mutual camming action of the interengaging rack and pinion teeth in response to a turning of the steering wheel 15 or a low-intensity axial thrust from one of the rods 19, 20. In the event of a sharp axial thrust, however, the rack 3 turns in the aforedescribed manner, e.g. as illustrated in FIG. 2, to disalign its median axial plane 8 from the transverse midplane of pinion 2 as the toothed surface of the rack rolls on the barrel-shaped central portion of the pinion without mutual disengagement of the teeth 9 and 11; at this point the rack 3 is no longer cradled between the arcuate faces 12d of sleeve 12 and, though temporarily wedged between the sleeve and the pinion, occupies an unstable position from which it is subsequently returned to normal by the pressure of springs 6 upon slider 5.

I claim:

1. A steering gear for a vehicle equipped with a steering column and a pair of dirigible wheels, comprising a pinion rigid with said column with crests whose radii decrease progressively outwardly from an intermediate portion of said pinion whereby the latter has a barrel-shaped profile in the region of said portion; a rack having oblique teeth in engagement with said helicoidal teeth and adapted to roll on said barrel-shaped profile, said rack being of generally circular cross-section except for a flat face angularly offset from said oblique teeth; tie means linking said rack with said wheels; mounting means including a housing traversed by said rack and supporting same with freedom of rotation about its axis; pressure means guided in said housing for radial motion with reference to said axis; resilient means urging said pressure means into contact with said flat face, thereby resisting rotation of said rack and tending to maintain same in a predetermined rotary position; and stop means limiting the extent of radial motion of said pressure means against the force of said resilient means upon rotation of said rack from said predetermined position, in response to severe axial thrusts from said tie means, to maintain said oblique teeth in mesh with said helicoidal teeth while temporarily wedging said rack between said pinion and said pressure means.

2. A steering gear as defined in claim 1 wherein the pitch angle of said helicoidal teeth is approximately 45°.

3. A steering gear as defined in claim 1 wherein said pressure means comprises a sleeve slidably received in said housing and a member slidably held in said sleeve, said resilient means having one end bearing upon said housing and another end bearing upon said sleeve and said member.

4. A steering gear as defined in claim 3 wherein said stop means forms part of said housing, the latter enclosing said sleeve with limited clearance.

5. A steering gear as defined in claim 3 wherein said sleeve has a bore receiving said member and a cutout perpendicular to said bore receiving said rack, said cutout dividing a part of said sleeve into a pair of prongs bracketing said rack.

6. A steering gear as defined in claim 5 wherein said member consists of plastic material and said cutout extends beyond said prongs on opposite sides of said bore to a level normally spaced from the plane of said flat face to an extent enabling limited deformation of said member upon rotation of said rack.

7. A steering gear as defined in claim 6 wherein said plastic material is Teflon.

8. A steering gear as defined in claim 3 wherein said resilient means comprises a stack of Belleville springs.

References Cited

UNITED STATES PATENTS

| 3,074,735 | 1/1963 | Ulrich | 74—422 X |
| 3,131,978 | 5/1964 | White | 74—499 X |

FOREIGN PATENTS

| 1,075,959 | 2/1960 | Germany. |
| 911,364 | 11/1962 | Great Britain. |
| 939,940 | 10/1963 | Great Britain. |
| 976,661 | 12/1964 | Great Britain. |

KENNETH H. BETTS, *Primary Examiner.*

U.S. Cl. X.R.

74—500